(12) United States Patent
Mailaender

(10) Patent No.: US 9,477,211 B2
(45) Date of Patent: Oct. 25, 2016

(54) APPARATUS FOR CONTROLLING THE OPERATION OF A MACHINE, LOCKING INSERT FOR SUCH AN APPARATUS, AND ASSOCIATED METHOD OF OPERATION

(71) Applicant: Joachim Mailaender, Stuttgart (DE)

(72) Inventor: Joachim Mailaender, Stuttgart (DE)

(73) Assignee: EUCHNER GMBH & CO. KG, Leinfelden-Echterdingen (DE)

( * ) Notice: Subject to any disclaimer, the term of this patent is extended or adjusted under 35 U.S.C. 154(b) by 148 days.

(21) Appl. No.: 13/261,832

(22) PCT Filed: Nov. 19, 2012

(86) PCT No.: PCT/EP2012/004793
§ 371 (c)(1),
(2) Date: Mar. 21, 2014

(87) PCT Pub. No.: WO2013/075812
PCT Pub. Date: May 30, 2013

(65) Prior Publication Data
US 2014/0288687 A1 Sep. 25, 2014

(30) Foreign Application Priority Data
Nov. 21, 2011 (DE) .......................... 10 2011 119 413

(51) Int. Cl.
*G05B 9/02* (2006.01)
*F16P 3/08* (2006.01)

(52) U.S. Cl.
CPC .. *G05B 9/02* (2013.01); *F16P 3/08* (2013.01)

(58) Field of Classification Search
None
See application file for complete search history.

(56) References Cited

U.S. PATENT DOCUMENTS

| 2007/0204662 A1* | 9/2007 | Pullmann | E05B 15/101 70/277 |
| 2007/0205089 A1* | 9/2007 | Fukumoto | F16P 3/08 200/334 |
| 2011/0259060 A1* | 10/2011 | Leska | F16P 3/10 70/174 |
| 2012/0005748 A1* | 1/2012 | Zondler | G05B 9/02 726/21 |

FOREIGN PATENT DOCUMENTS

| DE | 10 2004 038488 A1 | 2/2006 |
| DE | 10 2008 055 685 A1 | 4/2010 |
| DE | 10 2008 060004 A1 | 5/2010 |
| DE | 10 2008 060010 | 6/2010 |
| DE | 10 2010 035 765 A1 | 2/2012 |
| EP | 0 801 801 A1 | 10/1997 |
| EP | 0 814 490 A2 | 12/1997 |
| GB | 2158911 | * 11/1985 |

* cited by examiner

*Primary Examiner* — Sean Shechtman
*Assistant Examiner* — Steven Garland
(74) *Attorney, Agent, or Firm* — Wenderoth, Lind & Ponack, L.L.P.

(57) ABSTRACT

An apparatus (1) for controlling the operation of a machine (3) includes a device for monitoring the status of a safety device (2), in particular a safety switch for monitoring the closed status of a safety gate or similar of the safety device (2). When the safety device (2) is in the closed state, the apparatus (1) can provide an enabling signal for operation of the machine (3) and has a detection device (10) for detecting a locking insert (14). The insert can be effectively connected to the detection device (10), is portable, and can be removed from the detection device (10) without the use of a tool. When the safety device (2) is in the closed state, the apparatus (1) will provide the enabling signal only if the locking insert (14) is effectively connected to the detection device (10).

5 Claims, 3 Drawing Sheets

APPARATUS FOR CONTROLLING THE OPERATION OF A MACHINE, LOCKING INSERT FOR SUCH AN APPARATUS, AND ASSOCIATED METHOD OF OPERATION

FIELD OF THE INVENTION

The present invention relates to an apparatus for controlling the operation of a machine, a locking insert for such an apparatus as well as a method of operation of such an apparatus.

BACKGROUND OF THE INVENTION

Such apparatuses have a device for monitoring the status of a safety device for the machine, in particular a safety switch for monitoring the closed status of the safety gate or the like of the safety device. When the safety device is in a closed state, the apparatus can provide an enabling signal for the operation of the machine. When the safety device is in an opened state, the safety switch interrupts one or more circuits, for example, by an electrical contact pair that is actuated by positive locking or by an electronic switching element. The enabling signal is then no longer provided. The associated machine is thereby transferred to a secure operational state, for example, shut down, or a startup of the machine is prevented.

A safety switch is known from EP 0 801 801 A1, in which a mechanically encoded actuator can be inserted in a switch head, upon which a control gear rotates. The control gear actuates an electrical switch by a plunger.

A safety switch, known from DE 197 11 588 A1, has a reading head and an electronically encoded actuator, each of which have a first or second electronic assembly respectively having electrical and/or electronic components. These components can be brought into interaction with one another without an electrical contact, and thereby, control the safety switch.

For safety switches having a mechanically encoded actuator, blocking inserts are known. Blocking inserts are inserted into the switch head of the safety switch and can be secured there against unauthorized removal. When the locking insert is inserted, it is no longer possible to insert the actuator into the switch head, so that the safety switch prevents the machine disposed inside the safety device from starting up, either directly, or by a superordinate control device. Such blocking inserts may be used by machine technicians, for example, so that, when entering the space within the safety device, they can prevent the machine from being made operational when the safety device is closed. For this purpose, the blocking inserts can also be fixed to the switch head by U-locks.

A safety control and a method for controlling an automated system is known from DE 10 2008 060 010 A 1.

An apparatus for monitoring the status of a safety device of a machine is known from DE 10 2008 055 685 A 1.

SUMMARY OF THE INVENTION

An object of the present invention is to provide an improved apparatus for controlling the operation of a machine, a locking insert for such an apparatus, as well as a method of operation for such an apparatus, which reliably prevent an unintentional startup of the machine or a startup of the machine that is impermissible for safety reasons, and which are thereby also easy to handle taking into account the environmental conditions that prevail at the manufacturing facility.

This object basically is achieved by the apparatus, as well as by the locking insert and method of operation of the invention.

The apparatus has a device for monitoring the status of the safety device for the machine, for example a safety switch. The safety switch signals the closed state of the safety device, upon which the apparatus provides an enabling signal for the operation of the machine and passes this signal on, for example, to a higher-level machine controller. The machine can be put into operation when the enabling signal is present.

The apparatus according to the invention has a detection device for detecting a locking insert, which locking insert can be operatively connected to the detection device. The locking insert is portable and, in particular, can be removed from the detection device without the use of tools. For example, the locking insert can be removed by an operator, and the operator can take the locking insert with the operator. When the locking insert is removed, no enabling signal is provided by the apparatus. A startup of the machine is then thereby reliably prevented. Whether the safety device is closed or not is irrelevant, in particular, even when the safety device is in a closed state, the enabling signal is only provided when the locking insert is operatively connected to the detection device.

In one embodiment, a missing locking insert does not otherwise affect the operation of the apparatus, in particular a missing locking insert does not lead to a power down of the apparatus. As a result, the apparatus can still recognize whether the safety device is closed or not, for example. The apparatus can also signal to a higher-level machine controller that, although the safety device is closed, due to the fact that the locking insert has been removed, no enabling signal can be provided.

Such apparatuses may be used, for example in the maintenance of machines and systems. Before the authorized personnel enter the safety zone around the machine or system, the locking insert is disengaged from its operative connection to the detection device and brought into the safety zone, for example by authorized personnel. Should the safety device be closed, a startup of the machine that could pose a hazard to personnel is reliably prevented, since the apparatus provides no enabling signal.

In one embodiment, signal processing and the output of the signal to the apparatus, in particular the detection device, are carried out in accordance with the applicable safety regulations and safety standards. Thus, for example, signal processing may be carried out redundantly via dual channels and/or the output of a signal by the detection device to the apparatus may be carried out via dual channels. If only one of the two channels signals that no operative connection exists between the detection device and the locking insert, no enabling signal is provided.

In one embodiment, the interaction of the locking insert with the detection device is mechanically and electrically independent of the interaction of the components of the device for monitoring the status of the safety device for the machine, in particular independent of the interaction of a switch head and an actuator of a safety switch. Unlike the blocking inserts for mechanically encoded actuators of safety switches, the safety device can be closed independently of whether the locking insert interacts with the detection device or not. Damage to the safety switch as a result of forcibly closing the safety device, despite the fact that the mechanical locking insert is inserted, is thereby excluded.

In one embodiment, the locking insert has a unique identifier that can be sent as a signal to the detection device, and the apparatus only provides the enabling signal when the detection device is in an operative connection to the locking insert, which locking insert has an identifier expected by the apparatus. For this purpose, the locking insert can have data memory, in which a digital code is stored electronically, which digital code can be transmitted to the detection device when there is an operative connection thereto. For example, a code that is multiple bits in length can be stored in memory. The unique identifier preferably cannot be detected without an external electronic tool, thereby increasing the tamper resistance. The encoding of the locking insert may be non-modifiable, for example by using Read Only Memory (ROM) or of Programmable Read Only Memory (PROM). Alternatively, it may also be possible to supplement or overwrite the contents of the memory. An erasable programmable read only memory (EPROM), electrically erasable programmable read only memory (EEPROM) or the like may be used.

In one embodiment, the locking insert can be operatively connected to the detection device without an electrical contact. For example, the signals can be transmitted by electromagnetic waves, optically, or in another manner, between the locking insert and the detection device.

In one embodiment, the locking insert has a transponder that responds to an impulse, for example from a reading coil of the detection device, for example by transmitting the code stored in memory. The electrical energy for operating the locking insert can thereby be obtained from an electromagnetic field generated by the detection device. The range of the transponders, or the reading coil, respectively, of the detection device can thereby be less that 20 cm, in particular less than 10 cm and preferably approximately 5 cm, to prevent an unintentional readout of the locking insert.

Alternatively or in addition, a sensor may also be disposed on the detection device, guaranteeing that the locking insert can only be read out when the locking insert appropriately approaches the detection device, for example when the locking insert is inserted into a receptacle provided therefor on the detection device. To this end, for example, the locking insert may have a permanent magnet that interacts with a magnetic sensor element, for example a reed switch.

In one embodiment, the detection device has a receiving element for receiving the locking insert. The locking insert can only be operatively connected to the detection device when that locking insert is in a state of having been received in the receiving element. For example, the detection device may have a slit as a receiving element, into which the locking insert can be inserted. The locking insert is preferably releasably fixed in the position provided for the interaction with the detection device, for example, by being clamped by a securing mechanism.

When the locking insert is inserted, the data of the locking insert, in particular the data in memory, are read out by the detection device and checked for validity. If the inserted locking insert is recognized as valid, the apparatus can provide the enabling signal, subject to any further conditions such as, for example, the detection of the closed safety device. If, however, no locking insert or no valid locking insert is read out, the apparatus will block the provision of the enabling signal. A startup of the machine is therefore only possible when a locking insert is present and when the locking insert is recognized by the detection device as valid.

In one embodiment, the apparatus has multiple detection devices, and the apparatus only provides an enabling signal when each detection device is operatively connected to a locking insert. Each detection device has at least one expected value in terms of the identifier associated with the locking insert. In one embodiment, which locking insert acting together with which of the multiple detection devices is irrelevant, as long as the condition that each detection device is operatively connected to a locking insert has been met. Multiple persons can then enter the safety zone of the machine at the same time, and each person may remove one of the blocking inserts, and thus, reliably prevent a startup of the machine.

In one embodiment, the apparatus signals the status of the operative connection between the locking insert and the detection device and/or the status that no such operative connection exists. The signaling may be carried out vis-à-vis a higher-level machine controller and/or may be done locally, for example, optically and/or acoustically. Thus, for example, a lamp on the apparatus or directly on the detection device can signal the interaction of the detection device with a valid locking insert. For example, a light-emitting diode, which may be multicolored if necessary, can be disposed, which signals, by a green or red light, whether or not an operative connection exists with valid locking insert.

In one embodiment, the device for monitoring the status of the safety device has a safety switch comprising a switch head and an actuator, which can be brought into interaction with one another. The actuator may be an electronically encoded actuator, which can be placed in proximity to the switch head switch head of the apparatus to interact therewith. The detection device for detecting the locking insert can be constructed such that it is identical to the reader device of the switch head for interaction with the actuator. In particular, both the detection device and the reader device of the switch head may exhibit a redundancy to increase safety, in particular a dual-channel signal processing and/or signal output.

The location of the operative connection between the locking insert and the detection device may be placed at a distance from the site of interaction between the actuator and the switch head. For example, the detection device for the locking insert may be placed at a distance from the safety device to prevent an unintentional or manipulative removal of the locking insert. For example, the detection device may be disposed in a control cabinet that is at a distance from the safety device.

In one embodiment, the device for monitoring the status of the safety device for the machine also has a retainer for retaining the closed status of the safety device. The retainer may be a mechanical sliding bolt, an anchor plate of an electromagnetic guard control or the like, which prevents an opening of the closed status of the safety device, for example as long as the machine is in operation or in another operational state that poses a hazard to personnel. The retainer can only be activated when the locking insert is operatively connected to the detection device. For example, when the locking insert is not inserted, activating the guard control is impossible, so that the safety device can be opened at any time.

In one embodiment, the apparatus has a blocker, by which access for the locking insert in a spatial region that enables an operative connection to the detection device can be blocked. In this way, by locking the blocker, a person entering the safety zone can ensure that no locking insert can be operatively connected to the detection device. For example, a mechanical blocker can block access to a receptacle of the detection device for the locking insert. The blocker may be releasably lockable, for example in the position in which the blocker blocks access for the locking insert. Locking may be effected, for example, by a padlock that can be hooked into the blocker. Multiple locks may also simultaneously lock the blocker, so that multiple persons can simultaneously ensure that no locking insert can be placed in an operative connection to the detection device, for example. Only when the last lock has been removed can the blocker can be moved out of its blocking position.

The invention also relates to a locking insert for use in an apparatus as described above. The locking insert is portable and can be operatively connected to a detection device of the apparatus, as well as removed from the detection device, preferably without the use of tools. Due to a code stored in the locking insert, in addition to the function as a locking insert, the selection of one of several modes of operation of the machine can be controlled. Thus, for example, certain modes of operation may only be permitted for authorized personnel. The locking insert must be operatively connected to the detection device to select the appropriate mode of operation. To this end, the locking insert may also interact with additional detection devices of the same apparatus or with additional detection devices of additional apparatuses. For example, the locking insert may simply function as a locking insert in the case of the one apparatus, while that locking insert may also, or only, function as a switch for selecting a mode of operation in the case of an additional device and, for example, may enable or switch on a set-up mode for the machine.

The invention relates to a method for controlling the operation of a machine having an apparatus as described above. In one embodiment, an interruption of the operative connection between the locking insert and the detection device during operation of the machine does not cause the operation to be interrupted. Instead, the machine may continue to operate with limitations, if necessary, and/or for a limited period of time. Nevertheless, restarting the machine after a standstill or another secure condition is only possible when the locking insert is again operatively connected to the detection device. This arrangement prevents the removal of the locking insert from leading to an immediate standstill of the machine in the manner of an emergency shutdown function.

Alternatively or in addition, the interruption of the operative connection between the locking insert and the detection device may also be associated with a required entry of a code to allow the enabling signal to be effectively blocked. A further alternative is in locking the option of interrupting the operative connection between the detection device and the locking insert, for example as long as the machine in operation. Alternatively or in addition, the locking insert can also be fixed in one position, for example, by a magnetic force, which position ensures an operative connection with the detection device as long as the machine is in operation.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
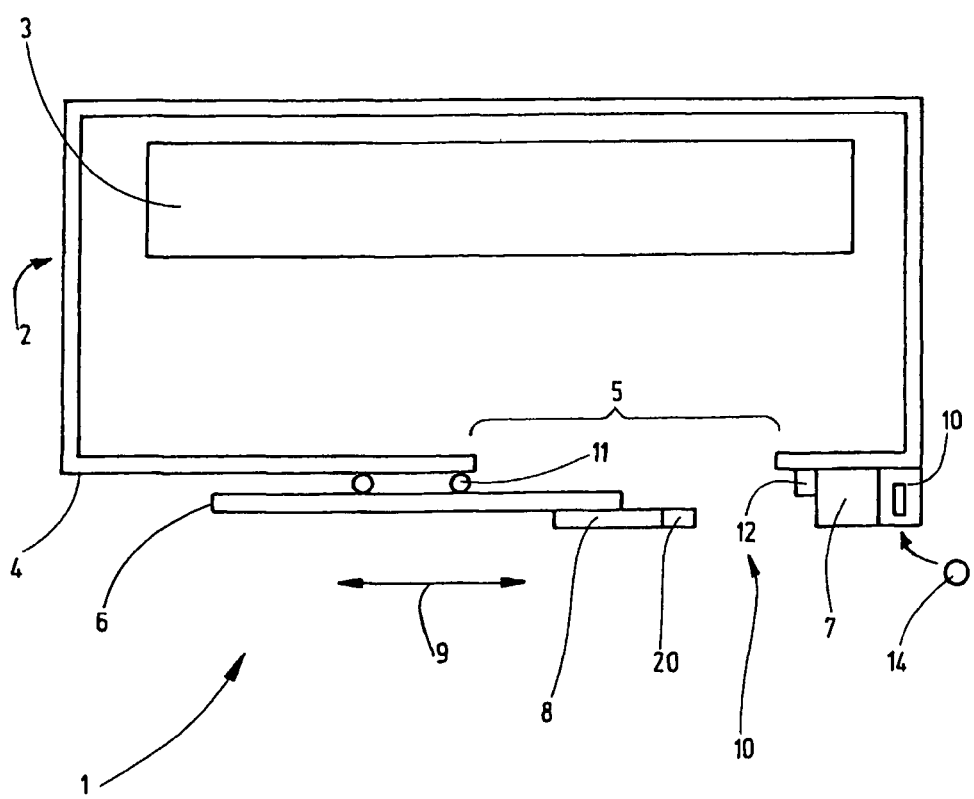
FIG. 1 is a top view of a schematically illustrated arrangement of an apparatus according to a first exemplary embodiment of the invention for controlling the operation of a machine.

FIG. 1 shows a top view of a schematically illustrated arrangement of an apparatus 1 according to the invention for controlling the operation of a machine 3 having a device for monitoring the status of a safety device 2 for the machine 3. In particular, a safety switch monitors the closed status of the safety gate or the like of the safety device 2, for example, to protect the operating personnel from a hazard posed by the machine 3 in operation. When the safety device 2 is in a closed state, the apparatus 1 is able to provide an enabling signal for the operation of the machine 3.

The safety device 2 has a first part 4, for example a fixed frame. The first part 4 has an opening 5. Opening 5 can be closed by a second part 6, for example, a safety gate, which is movably mounted by mounting elements 11 and which can be moved relative to the first part 4 in accordance with the double arrow 9. Instead of sliding, the safety gate may also be pivoted.

The apparatus 1 has a safety switch, with a switch element 7 that is preferably disposed on the fixed first part 4 of the safety device 2. The switching element has a switch head 12, and comprises an actuator 8 that is preferably disposed on the movable second part 6. The actuator 8 can be operatively connected to the switch head 12 when the safety gate is closed. The second part 6 thereby controls the switch element 7. The switch element 7 can switch the machine 3 on and off either by itself, by separate switching elements, or by an ancillary or higher-level controller by providing an enabling signal.

In this embodiment, the actuator 8 has a transponder 20, which can interact with the switch head 12 in an electrically contactless manner. The switch head has a reading coil. Interaction is thereby only possible when the safety device 2 is closed. When closing the safety device 2, a switching element is closed by the interaction between the actuator 8 and the switch head 12 for example. An enabling signal is thereby provided for the operation of the machine 3. When the safety device 2 is opened, the interaction is interrupted, the switching element is opened, and the machine 3 is shut off.

The apparatus 1 may also have a retaining device, by which the closed state of the safety device 2 can be releasably locked. The guard control may be realized mechanically, for example, by a preferably positive locking fixing of the actuator 8 to the switch head 7 by a magnetic force or in another suitable manner.

The apparatus 1 has a detection device 10 for detecting a locking insert 14. The locking insert 10 can be operatively connected to the detection device 10, is portable, and can be removed from the detection device 10, preferably without the use of tools. When the safety device 2 is in a closed state, the apparatus 1 also only provides the enabling signal when the locking insert 14 is operatively connected to the detection device 10. When the locking insert 14 is removed from the detection device 10, there is no longer an operative connection, so that the apparatus 1 can no longer provide an enabling signal. Therefore the machine 3 cannot be put into operation, regardless of the open or closed status of the safety device 2.

The locking insert 14 interacts with the detection device 10 in an electrically contactless manner, for example, with a reading head of the detection device 10, which may be constructed such that it is identical to the reading head 12 of the device for monitoring the safety device 2. In the illustrated embodiment, the detection device 10 is disposed directly on the switch element 7. Alternatively or in addition to this, the detection device 10, or an additional detection device, may also be disposed at a location that is removed or spaced from the switch element 7 or the safety device 2, for example, in a control cabinet. Access to the detection device 10 may be limited to a definable group of individuals, for example, by only being accessible by a lockable door of a control cabinet.

Figure 2:
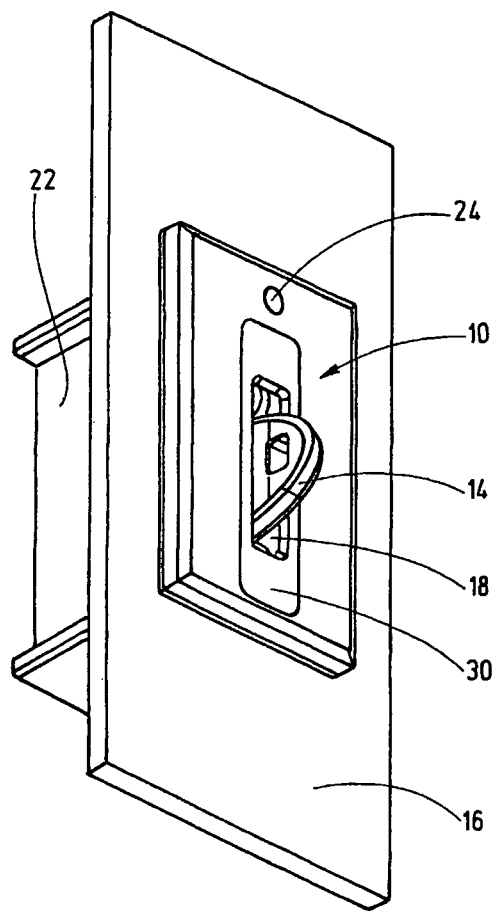
FIG. 2 is a perspective view of the detection device fixed to a front plate of FIG. 1.

FIG. 2 shows a perspective view of the detection device 10 fixed to a front plate 16. The dimensions of the front plate 16 can be adapted to a definable or even a standardized size, and thus, can be designed as an easily replaceable part of a larger control unit. Multiple identical detection devices 10 may also be disposed on the apparatus 1.

The detection device 10 has a receiving element 30 having a receiving slot 18 for the insertion of the locking insert 14. In the inserted state of the locking insert 14, as shown, an operative connection exists between the locking insert 14 and a reading head of the detection device 10, which reading head is disposed in a housing 22 and therefore is no longer visible. In this state, data can be exchanged without an electrical contact between the locking insert 14 and the detection device 10. In particular, a unique code stored electronically in the locking insert 14 can be transferred from the locking insert 14 to the detection device. If the locking insert 14 is removed from the receiving slot 18, the operative connection is interrupted, and the apparatus 1 does not provide an enabling signal for the operation of the machine 3.

A lamp 24 is disposed on the detection device 10, which in this embodiment is a light-emitting diode. Lamp 24 provides a signal that an operative connection exists between the locking insert 14 and the detection device 10, for example by a green light, or a signal that no such operative connection exists, for example by means of a red light.

Figure 3:
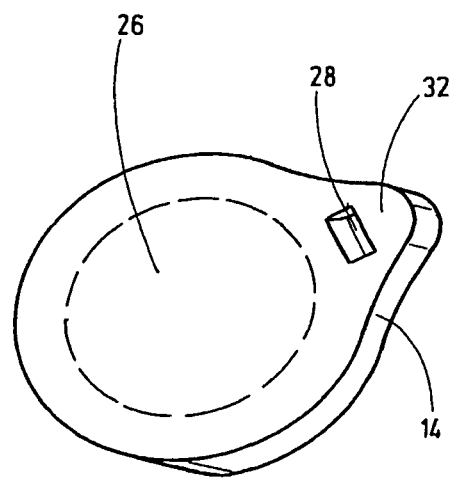
FIG. 3 is a perspective view of the essentially disk-shaped locking insert of FIG. 3.

FIG. 3 shows a perspective view of the essentially disk-shaped locking insert 14. A data memory and a receiver antenna are disposed in a central region 26 such that these are not visible from the outside and are protected against damage and manipulation. An attachment opening 28 is provided in the region of a peripheral, cam-shaped lug 32. Wth opening 28, the locking insert 14 can be attached, for example, to a key ring.

Figure 4:
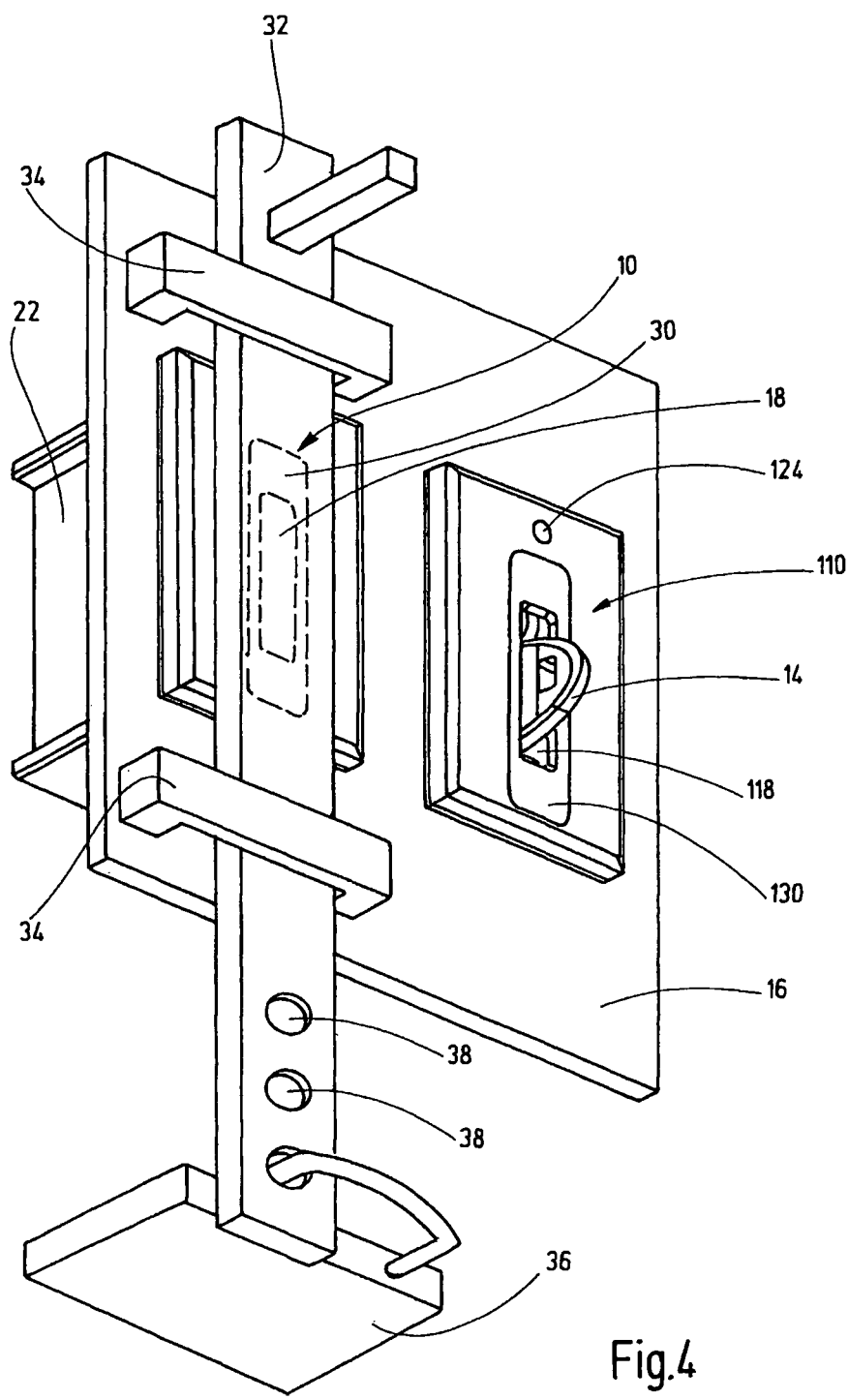
FIG. 4 is a perspective view of an apparatus according to a secondary exemplary embodiment of the invention.

FIG. 4 shows a perspective view of an additional embodiment. In the state illustrated, access to the receiving slot 18 of the receiving element 30 of the detection device 10 is blocked by a blocker 32 formed in the illustrated embodiment as a sliding bolt. No locking insert 14 can be operatively connected to the detection device 10 with blocker 32 in the illustrated position. The blocker 32 is mounted in two guides 34 fixed on the front plate 16, such that the blocker can be longitudinally displaced. In the blocking position, the blocker 32 can be locked by a lock 36, in this embodiment, by one or more padlocks. To this end, the blocker 32 has multiple openings 38, into each of which a lock 36 can be placed or inserted. For example, ten or more openings 38 for ten or more locks 36 may be provided. Only when all locks 36 have been removed, can the blocker 32 be removed, thereby enabling access for the locking insert 14.

In addition to the first detection device 10, an additional or second detection device 110 is disposed in this embodiment, with which the locking insert 14 can be operatively connected after being removed from the first detection device 10. The second detection device 110 may be essentially identical in its structure to the first detection device 10, and in particular may likewise have a receiving element 130 having a receiving slot 118 for the insertion of the locking insert 14, as well as associated signal devices 124. This embodiment has the advantage of detecting the operative connection of the locking insert 14 with the second detection device 110. For example, after the operative connection of the locking insert 14 with the detection device 10 has been interrupted, a control unit could expect an operative connection with the second detection device 110 within a definable period of time. Otherwise, the control unit may emit a signal, for example, an acoustic signal, as a reminder to insert the locking insert 14 into the receiving slot 118 of the second detection device 110. Alternatively or in addition, a simple receptacle for the locking insert 14 may be provided, on which the locking insert 14 may be disposed during the interruption of the operative connection with the detection device 10. The locking insert 14 can also be disposed on the detection device 10 in a captive manner, for example being fixed to the front plate 16 with a chain.

While various embodiments have been chosen to illustrate the invention, it will be understood by those skilled in the art that various changes and modifications can be made therein without departing from the scope of the invention as defined in the claims.

The invention claimed is:

1. A method of controlling operation of a machine, comprising the steps of:
   monitoring status of a safety device of the machine as to open and closed states of the safety device;
   only when the safety device is in the closed state thereof, providing a first enabling signal for operation of the machine;
   detecting an operative connection of a portable locking insert with a detection device, the locking insert being movable between operative and non-operative connections with the detection device without using tools;
   providing a second enabling signal for operation of the machine only when the locking insert is operatively connected to the detection device;
   operating the machine being possible only when both of the first and second enabling signals are provided, with only one of the enabling signals being insufficient to initiate operation of the machine;
   during operation of the machine, maintaining operation of the machine while the operative connection of the locking insert with the detection device is interrupted; and
   only permitting restarting of the machine or another secure condition after the locking insert is operatively connected to the detection device.

2. A method according to claim 1 wherein
   the locking insert has a unique identifying code electronically stored therein that is read by the detection device only when the locking insert is operatively connected to the detection device.

3. A method according to claim 1 wherein
the locking insert is operatively connected to the detection device without making an electrical contact therebetween.
4. A method according to claim 1 wherein
operative connections between multiple locking inserts and multiple detection devices is required for operation of the machine.
5. A method according to claim 1 wherein
different signals are displayed for operative and non-operative connections of the locking insert and the detection device.

\* \* \* \* \*